G. H. SPRENKLE.
GRAVITY LEVEL AND ANGLE FINDER.
APPLICATION FILED SEPT. 16, 1909.
964,066.
Patented July 12, 1910.
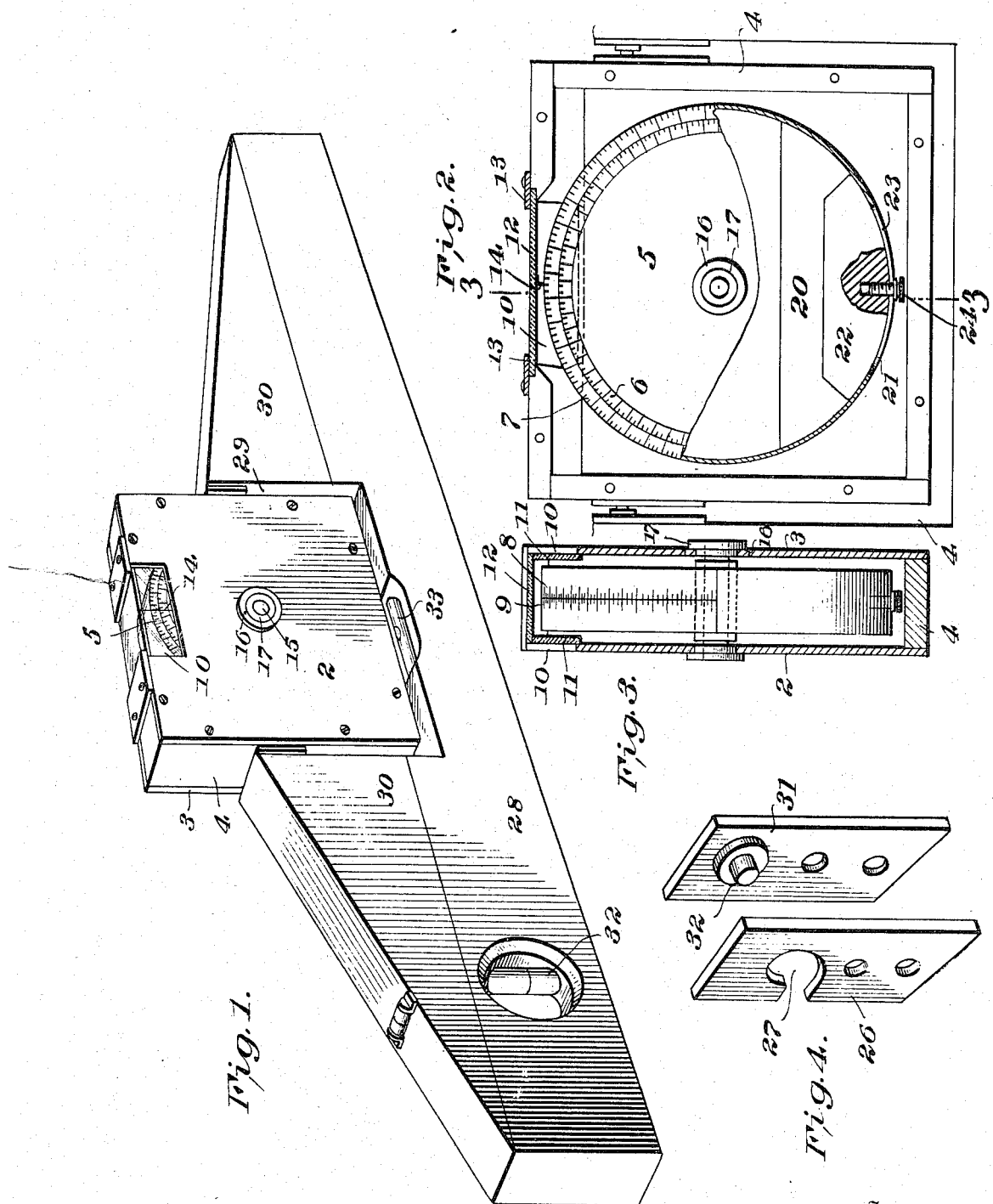
Witnesses
W. N. Woodson
Juana M. Fallin
Inventor
G. H. Sprenkle,
By A. Van Kacey, Attorneys

UNITED STATES PATENT OFFICE.

GEORGE H. SPRENKLE, OF HANOVER, PENNSYLVANIA.

GRAVITY LEVEL AND ANGLE-FINDER.

964,066.

Specification of Letters Patent.

Patented July 12, 1910.

Application filed September 16, 1909. Serial No. 518,097.

*To all whom it may concern:*

Be it known that I, GEORGE H. SPRENKLE, a citizen of the United States, residing at Hanover, in the county of York and State of Pennsylvania, have invented certain new and useful Improvements in Gravity Levels and Angle-Finders, of which the following is a specification.

My invention relates to inclinometers or instruments for observing the angular depression or elevation of objects, and the invention consists in the arrangements of parts and details of construction set forth in the accompanying specification, and more particularly stated in the claims appended.

My improved instrument is shown in the accompanying drawings, in which:

Figure 1 is a perspective view of a stock with my improved inclinometer attached thereto; Fig. 2 is a side elevation of the inclinometer, one side plate of the casing being removed and the dial being partly broken away; Fig. 3 is a vertical section on the line 3—3 of Fig. 2; and, Fig. 4 is a perspective detail view of the bearing members by which the casing is pivotally supported in the stock.

Corresponding and like parts are referred to in the following description and indicated in all the views of the drawings by the same reference characters.

Referring to these figures, 2 and 3 designate opposite plates forming the casing of the instrument, and 4 designates the end wall of the casing which closes in the three sides or ends of the casing. Rotatably mounted within the casing, so as to be freely rotatable upon its bearings, is the disk 5. This disk is provided with scales upon its opposed margins and upon its periphery, the marginal scales being designated 6 and 7, and the peripheral scales being designated 8 and 9. The scale 6 is graduated in inches, while scale 7 is graduated in degrees and fractions of a degree. The scale 8 is graduated in inches and scale 9 in degrees. It will be seen that the disk 5 is provided with scales on three faces, so that the figures may be read from the top or from the sides of the instrument. For the purpose of reading the figures, I cut away the side plates 2 and 3 of the casing, as at 10, whereby a segment of the disk may be read, and cover the side openings with the cover glasses 11. A cover glass 12 is also used, covering the upper end opening, which cover glass is held in place between buttons or projecting clips 13, which are screwed to the end walls 4, as shown in Fig. 2. The cover glass 12 and the cover glasses 11 are all provided with the index mark 14 which may be formed in any suitable manner, as by scratching said mark across the inner face of the glass. It will be seen that the disk 5 graduated as at 6, 7, 8 and 9, forms a rotatable dial which may be read through the openings in the side and end walls.

15 designates an axle on which the dial disk 5 turns, and 16 and 17 designate annular bearings of brass supported in the side of the dial case to give a broader bearing to the shaft 15 at both ends. One portion of the disk 5 is cut away, as at 20, and this cut-away portion is bridged by plate 21. A weight 22 is carried within this cut-away portion of the dial, and through the slot 23, in the bridge plate 21, passes a screw 24 which enters the weight 22. It will be observed that the weight may be thereby adjusted along the slot 23 to one side or the other, whereby the weight may be set, if the dial for any reason should become out of balance, and thus the scales be erroneously presented to the index marks. Thus error in the operation of my device may be corrected at any time by placing the machine upon an absolutely horizontal surface, noting if the zero marks of the degree and inch scales coincide with the index marks 14, and shifting the weight 22 until said marks do coincide, after which the weight is, of course, clamped in position.

One of the difficulties incidental to inclinometers of this class is the fact that when the stock in which the level is mounted is by chance inclined laterally from the vertical, that the movable indicator is likely to bind, so that it does not freely turn upon its pivot nor properly register the longitudinal inclination of the instrument. For the purpose of preventing this tendency to error, I provide the end walls of the dial casing with bearings in which are journaled trunnions mounted on the frame upon which the inclinometer is supported. Preferably the bearings which are attached to the end walls of the dial case are open bearings, such as is shown in Fig. 4, having the form of the plate 26, out of which has been cut a hook-shaped slot 27. The supporting stock or level proper, is designated 28. This is cut away, as at 29, on its upper edge, so as to provide two upwardly projecting opposed end portions 30 between which the dial case and dial are received. The inner faces of these end portions 30 are provided with the trunnion plates 31, having the trunnions 32. These trunnions project inwardly so as to be engaged with the slots 27. It will be seen that the slotted bearing plates 26 permit the dial to be detached from the level 28 when the level is being carried, so that no damage can occur to the dial in transit, and so that the inclinometer may be removed from its frame when the level is being used for ordinary work. The level 28, except for the provision of means for supporting the inclinometer is like other levels of the same character. It is provided with the vertical bubble tube 32, and with the horizontal bubble tube 33.

The advantages of my invention are obvious. The indicating marks are stationary, while the dial is movable. The dial can be observed from either side, as can any ordinary gravity level, and it can also be read from the top, which is not the case with ordinary gravity levels. The dial can be adjusted for error, and thus if it, at any time, gets out of order the error can be easily corrected. The dial being mounted so as to swing crosswise the length of the level, does not bind, but allows the dial to maintain, at all times, a perfect vertical position. It will be seen that the weight of the casing will act to keep the casing in a true vertical position, and that this is aided by the weight upon the dial.

My level, by reason of an absence of unnecessary parts, and thus doing away with unnecessary labor, is considerably cheaper than ordinary levels and is not so likely to get out of order.

While I have shown what I believe to be the preferable details of my invention, I do not wish to be limited thereto, as it is obvious that many changes may be made without departing from the spirit thereof.

Having thus described the invention what is claimed as new is:

1. An inclinometer including a casing having a sight opening and a fixed index therein, a disk rotatably supported within the casing and having a graduated scale upon its circumference, said disk at a point opposite to the graduated scale being cut away to form a segmental recess, a slotted arcuate support extending across said recess, a weight mounted within the recessed portion of the disk and smaller than the same, and means for engaging the weight with the slotted support.

2. An inclinometer including a casing having a sight opening and a fixed index therein, a disk rotatably mounted within the casing and having a graduated scale upon a portion of its circumference, a weight supported upon said disk opposite to the graduated scale, and a slotted support for the weight, said support extending concentrically to the axis of rotation of the disk.

3. An inclinometer including a casing having a sight opening and a fixed index therein, a disk rotatably supported in the casing and having a graduated scale upon its circumference, said disk being cut away at a point opposite to the graduated scale to form a segmental recess, a plate bridging the recessed portion of the disk, said plate being slotted, a weight located in the recessed portion, and a set screw passing through said slot in the plate and into the weight, whereby the weight may be circumferentially adjusted.

4. The combination with a leveling stock having upwardly extending supporting members upon its upper face, of an inclinometer supported in said upwardly extending portions, the inclinometer and the upwardly extending supporting members therefor being provided respectively one with an open-sided bearing and the other with a trunnion engaging with said bearing.

5. The combination with the stock of a level, said stock being recessed on its upper face and trunnions projecting toward each other from the inside faces of the recessed portions, of an inclinometer casing located within said recessed portion and having bearings within which said trunnions engage to support the casing for free swinging movement, a rotatable disk mounted in the casing and having a scale arranged upon its circumference, and an adjustable weight mounted upon said disk opposite to the scale, said casing being cut away to provide sight openings, the sight openings so formed being covered with glass, said glass being provided with an index mark whereby the scale upon the rotatable disk may be read.

6. An inclinometer including a rectangular casing having a sight opening formed in one side and having a fixed index supported in said sight opening, a disk rotatably supported within the casing, said disk being cut away at one portion of its margin to form a segmental recess, a metallic band surrounding the circumference of the disk and bridging the said recess, said band having a graduated scale upon its face, said disk being provided with graduated scales upon its side faces, adapted to be read through the sight opening in the casing, a weight supported within the recess of the disk and smaller than said recess, a screw passing through a slit formed in the said band and entering the weight, whereby the weight may be adjusted, a leveling stock having a recess upon its upper edge, in which the casing may be supported, and trunnions on the side edges of the casing and engaging with bearings in said recessed portion of the stock to permit the casing to have free lateral swinging movement.

In testimony whereof I affix my signature in presence of two witnesses.

GEORGE H. SPRENKLE. [L. S.]

Witnesses:
 WM. W. STREVIG,
 PAUL E. LAW.